United States Patent
Huang

(10) Patent No.: US 6,731,072 B2
(45) Date of Patent: May 4, 2004

(54) LIGHT GENERATOR FOR A ROTATABLE OBJECT

(76) Inventor: Kuo-Lin Huang, No. 85, Suan-Tou, Suan-Tou Tsun, Liu-Chiao Hsiang, Chia-I Hsien (TW)

(*) Notice: Subject to any disclaimer, the term of this patent is extended or adjusted under 35 U.S.C. 154(b) by 0 days.

(21) Appl. No.: 10/287,724

(22) Filed: Oct. 31, 2002

(65) Prior Publication Data
US 2003/0132723 A1 Jul. 17, 2003

(51) Int. Cl.[7] ............................. B60Q 1/00; B60Q 1/26
(52) U.S. Cl. ........................ 315/77; 315/303; 315/76; 362/500
(58) Field of Search ................ 315/303, 76, 77, 315/81; 362/500, 192, 184, 36, 234, 249, 800, 473; B60Q 1/00, 1/26

(56) References Cited

U.S. PATENT DOCUMENTS 5,497,302 A * 3/1996 O'Donnell ................. 362/500
6,322,237 B1 * 11/2001 Lee .......................... 362/500
6,398,395 B1 * 6/2002 Hyun ........................ 362/500

* cited by examiner

Primary Examiner—Don Wong
Assistant Examiner—Trinh Vo Dinh
(74) Attorney, Agent, or Firm—Ostrolenk, Faber, Gerb & Soffen, LLP

(57) ABSTRACT

A light generator includes a generator housing, an axle, a magnet, a coil device, a lamp unit, and a resistance unit. The generator housing is adapted to be secured to a rotatable object for co-rotation therewith, and is formed with an axle hole. The axle is mounted rotatably in the axle hole, and has a coupling end that extends out of the axle hole. The magnet is disposed in the generator housing, and is mounted co-rotatably on the axle. The coil device is mounted in the generator housing, and surrounds the magnet. The lamp unit is connected electrically to the coil device. The resistance unit is mounted on the coupling end of the axle to resist axial rotation of the axle. Rotation of the generator housing with the rotatable object induces electrical currents to enable the lamp unit to generate a light output.

13 Claims, 7 Drawing Sheets

LIGHT GENERATOR FOR A ROTATABLE OBJECT

BACKGROUND OF THE INVENTION

1. Field of the Invention

The invention relates to a light generator, more particularly to a light generator for a rotatable object.

2. Description of the Related Art

Referring to FIG. 1, a conventional hubcap is shown to include a cap body 10 formed with a plurality of vent holes 101, an impeller 11 formed with a plurality of blades 111, a permanent magnet 12, a coil device 13 and a lamp set 14 connected electrically to the coil device 13. When the cap body 10 rotates with a vehicle wheel (not shown), air passes through the vent holes 101 and pushes the blades 111 of the impeller 11 so as to drive the impeller 11 and the magnet 12 to rotate relative to the coil device 13, thereby inducing electrical currents in the coil device 13 that are provided to the lamp set 14 so as to enable the lamp set 14 to generate a light output. However, since the impeller 11 is driven by the air that passes through the vent holes 101, when the cap body 10 rotates slowly or when the vent holes 101 are blocked, the air flow will be insufficient to rotate the impeller 11, thereby resulting in a poor light generating effect.

SUMMARY OF THE INVENTION

Therefore, the object of the present invention is to provide a light generator for a rotatable object that can overcome the aforesaid drawback associated with the prior art.

According to the present invention, a light generator comprises:

- a generator housing adapted to be secured to a rotatable object for co-rotation therewith, the generator housing having a front housing part, a rear housing part, and an axle hole that extends from the front housing part through the rear housing part;
- an axle mounted rotatably in the axle hole and having a coupling end that extends out of the axle hole at the rear housing part;
- a magnet disposed in the generator housing and mounted co-rotatably on the axle;
- a coil device mounted in the generator housing and including a spool that surrounds the magnet, a coil wound around the spool, and a pair of conductive caps capped on an assembly of the spool and the coil, each of the conductive caps being connected electrically to a respective end of the coil;
- a lamp unit mounted on the generator housing and connected electrically to the conductive caps of the coil device; and
- a resistance unit mounted on the coupling end of the axle to resist axial rotation of the axle.

Rotation of the generator housing with the rotatable object results in rotation of the coil device relative to the magnet, thereby inducing electrical currents in the coil device that are provided to the lamp unit so as to enable the lamp unit to generate a light output.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
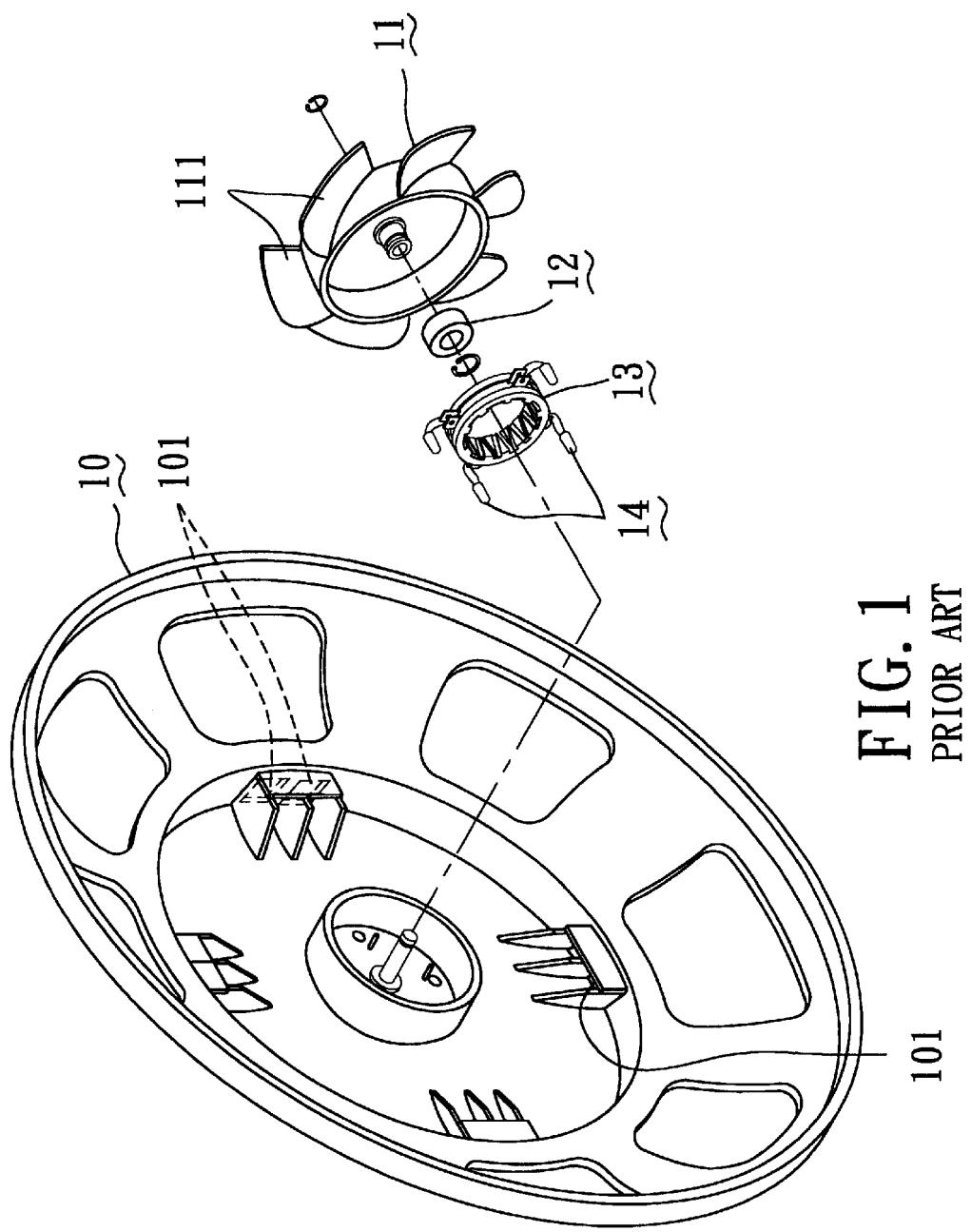
FIG. 1 is an exploded perspective view showing a conventional hubcap with a light generating capability.

For the sake of brevity, like elements are denoted by the same reference numerals throughout the disclosure.

Figure 2:
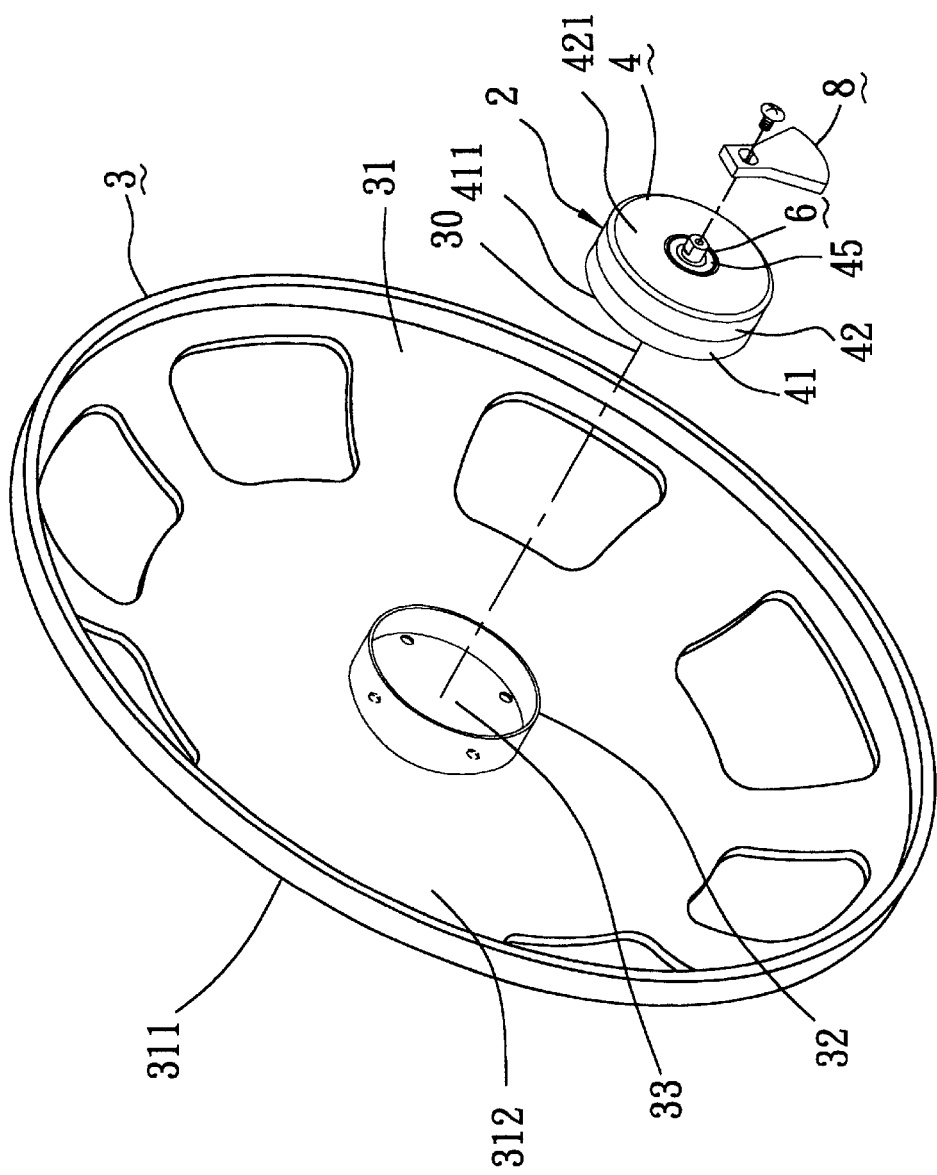
FIG. 2 is a partly exploded perspective view showing the first preferred embodiment of a light generator to be used with a hubcap according to the present invention.
Figure 3:
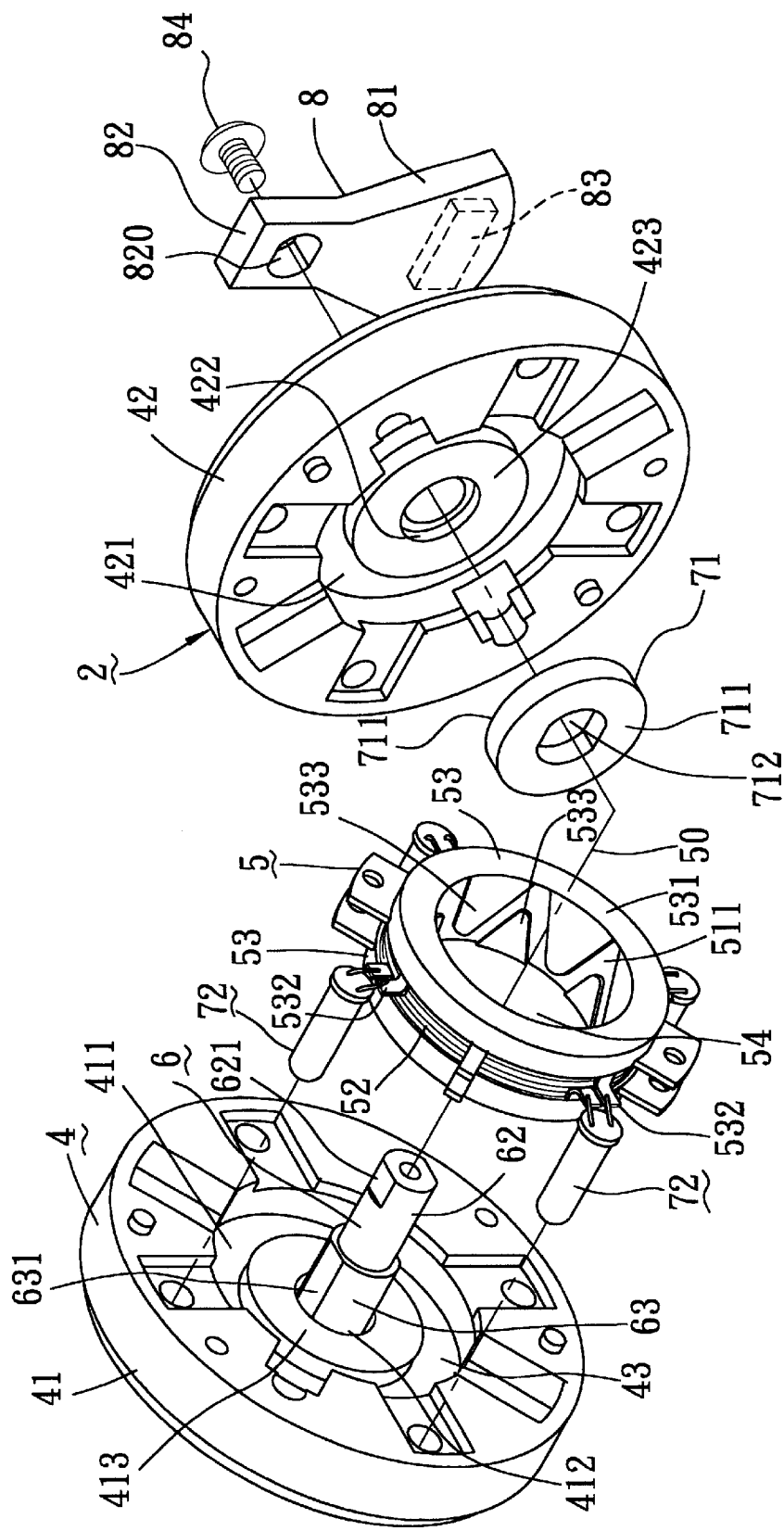
FIG. 3 is an exploded perspective view of the first preferred embodiment.
Figure 4:
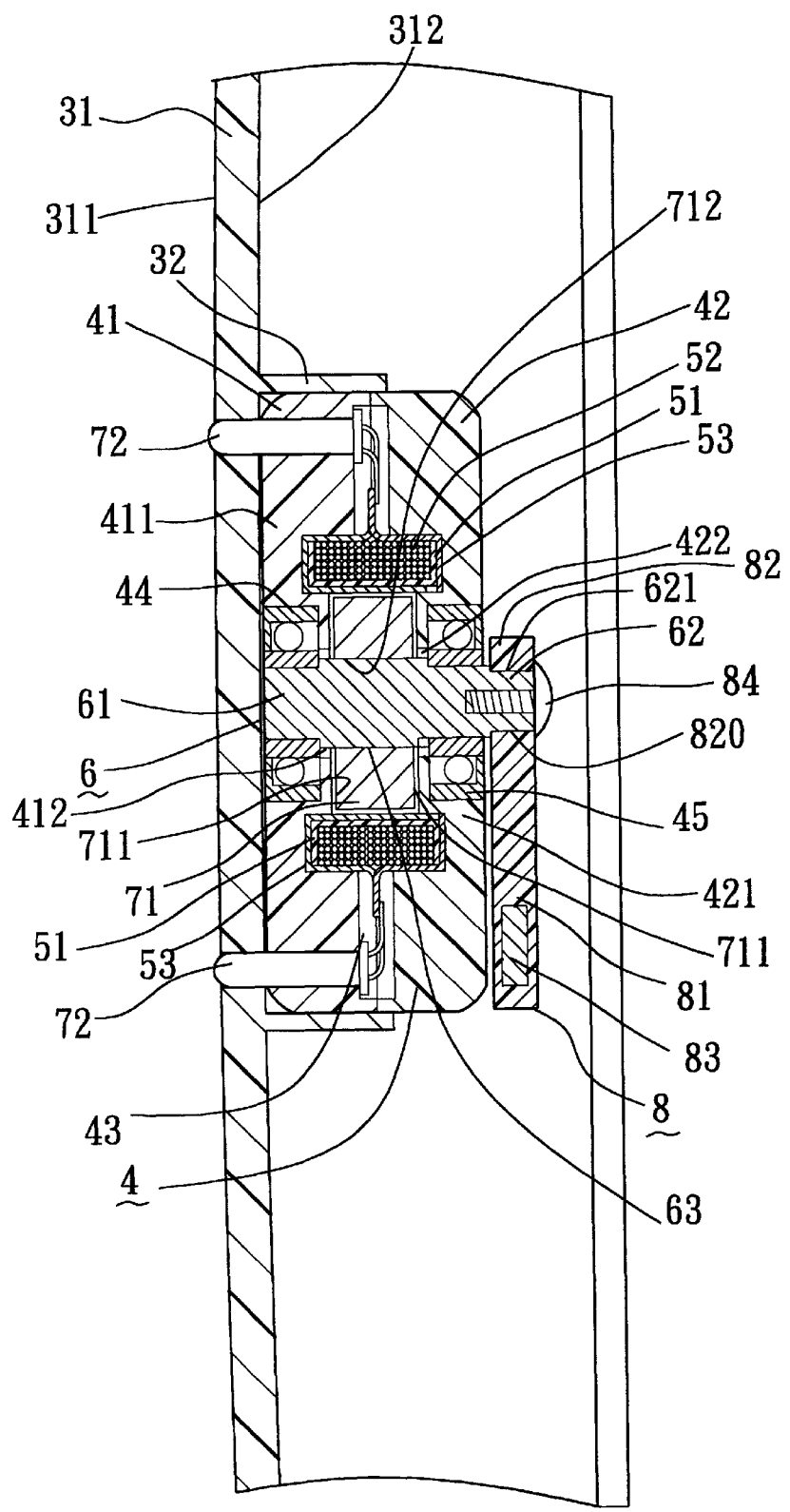
FIG. 4 is a schematic sectional view of the first preferred embodiment when mounted on a hubcap.

Referring to FIGS. 2 to 4, the first preferred embodiment of a light generator 2 according to the present invention is shown to be adapted to be used with a rotatable object, such as a hubcap 3. The light generator 2 includes a generator housing 4 adapted to be secured to the hubcap 3, a coil device 5 mounted in the generator housing 4, an axle 6 mounted rotatably to the generator housing 4, a magnet 71 disposed in the generator housing 4 and mounted co-rotatably on the axle 6, a lamp unit 72 connected electrically to the coil device 5, and a resistance unit 8 mounted on the axle 6.

The hubcap 3 is rotatable about an axis 30, and includes a circular base plate 31 that is centered at the axis 30. The circular base plate 31 has a front side 311, a rear side 312, and an annular wall 32 that is coaxial with the axis 30 and that extends from the rear side 312. The annular wall 32 confines a containing space 33.

The generator housing 4 is mounted fixedly in the containing space 33 of the hubcap 3. The generator housing 4 includes a front housing part 41 that is adjacent to the rear side 312 of the circular base plate 31, and a rear housing part 42 remote from the rear side 312. The rear housing part 42 is mounted to and cooperates with the front housing part 41 to form a generator chamber 43. The front housing part 41 includes a front wall 411 that is disposed transverse to the axis 30 and that is formed with a front through hole 412 in the center thereof. The rear housing part 42 includes a rear wall 421 that is also disposed transverse to the axis 30 and that is formed with a rear through hole 422 in the center thereof. The rear through hole 422 is aligned with the front through hole 412, and cooperates with the front through hole 412 to form an axle hole. The generator housing 4 further includes a front bearing 44 and a rear bearing 45 that are aligned with the through holes 412, 422 and that are mounted respectively on the front and rear walls 411, 421.

Figure 5:
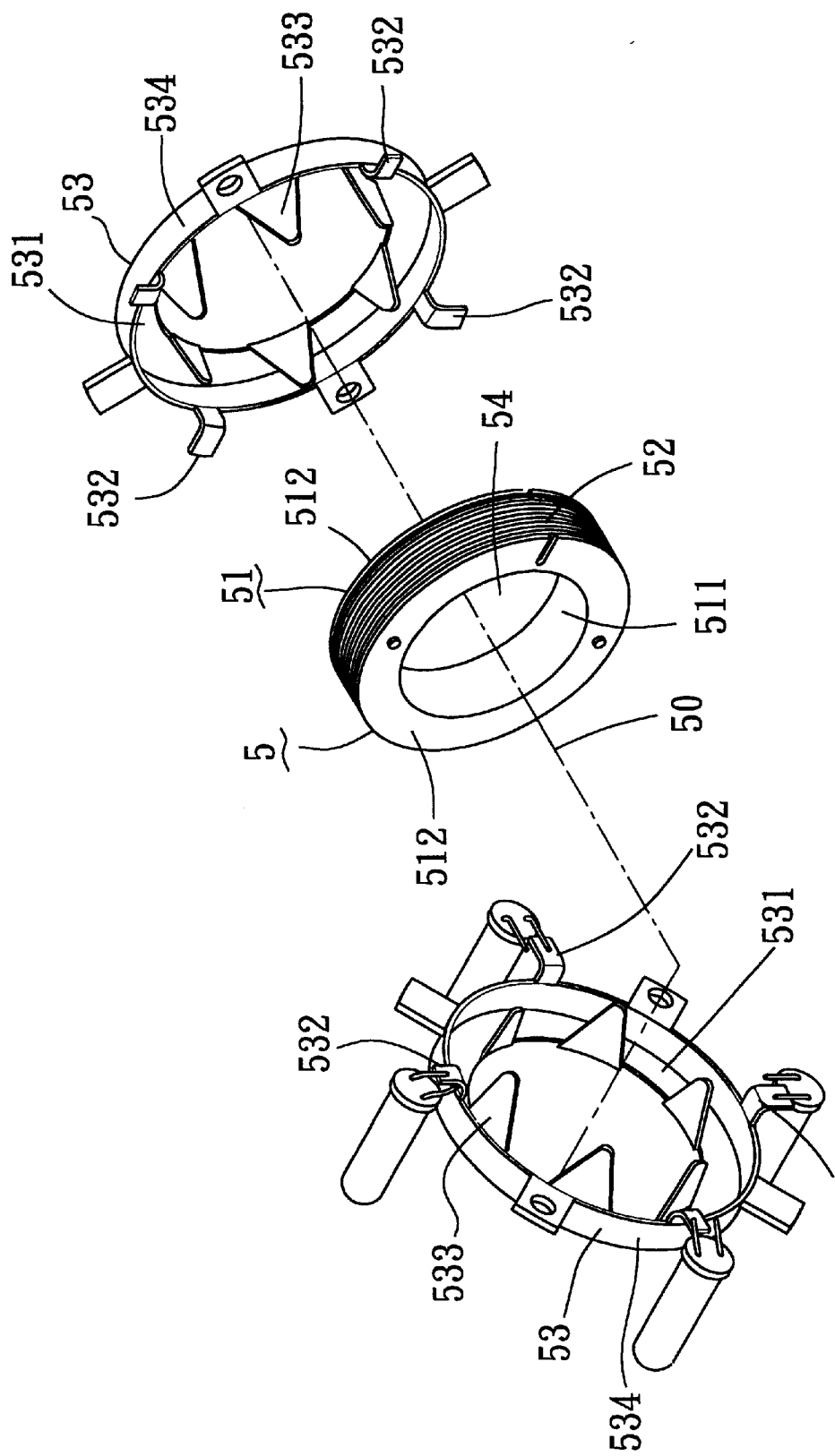
FIG. 5 is an exploded perspective view of a coil device of the first preferred embodiment.

With further reference to FIG. 5, the coil device 5 includes a spool 51 having a spool axis 50, a coil 52 wound around the spool 51, and a pair of conductive caps 53 capped on an assembly of the spool 51 and the coil 52. The spool 51 includes an enveloping ring 511 that surrounds the spool axis 50 and that confines a magnet containing chamber 54, and a pair of end flanges 512, each of which extends radially relative to the spool axis 50 from a respective end of the enveloping ring 511. Each of the conductive caps 53 is connected electrically to a respective end of the coil 52. Each conductive cap 53 includes a base ring 531 that extends in radial directions relative to the spool axis 50 and that has an inner circular edge and an outer circular edge, an annular wall 534 that extends perpendicularly from the outer circular edge of the base ring 531, a plurality of finger plates 533 that extend perpendicularly from the inner circular edge of the base ring 531 and that are angularly spaced apart from each other, and four lamp connecting members 532 that extend radially and outwardly from the annular wall 534 and that are angularly spaced apart from each other. In this embodiment, the spool axis 50 coincides with the axis 30. In practice, it is possible that the spool axis 50 may not coincide with the axis 30 of the hubcap 3.

The axle 6 is formed with a pivot end 61 that extends into the front through hole 412 and that is coupled rotatably to the front wall 411 by the front bearing 44, and a coupling end 62 that extends rearwardly and coaxially from the pivot end 61 and that extends out of the generator chamber 43 through the rear bearing 45 and the rear through hole 422. The axle 6 further includes a mounting portion 63 between the pivot and coupling ends 61, 62. The mounting portion 63 has a cross-section larger than that of the coupling end 62. The mounting portion 63 is formed with a pair of diametrically opposite planar surfaces 631. The coupling end 62 is also formed with a pair of diametrically opposite planar surfaces 621.

The magnet 71 is disposed in the magnet containing chamber 54 and is surrounded by the finger plates 533. In this embodiment, the magnet 71 is formed as a circular plate having opposite sides 711. The magnet 71 is formed with a through hole 712 that extends through the opposite sides 711 and that enables the magnet 71 to be sleeved non-rotatably on the mounting portion 63 of the axle 6. Each of the front and rear housing parts 41, 42 is formed with a positioning flange 413, 423 that extends into the magnet containing chamber 54 and that abuts against a respective one of the opposite sides 711 of the magnet 71, thereby positioning the magnet 71 in the magnet containing chamber 54.

In this embodiment, the lamp unit 72 includes a set of lamps, each of which is connected electrically to a pair of the lamp connecting members 532 of the conductive caps 53. Each of the lamps extends through the front housing part 41 of the generator housing 4 and is adapted to be aligned with a respective lamp hole that extends through the front and rear sides 311, 312 of the circular base plate 31 of the hubcap 3. The lamp unit 72 thus generates a light output that is visible from the front side 311 of the hubcap 3. Preferably, the lamps of the lamp unit 72 are configured to emit different colors of light.

The resistance unit 8 is mounted on the coupling end 62 of the axle 6 with the use of a fastener 84, and serves to resist axial rotation of the axle 6. The resistance unit 8 includes an elongate link plate having a connecting portion 82 that is formed with a hole 820 so as to enable the connecting portion 82 to be sleeved non-rotatably on the coupling end 62 of the axle 6, and a distal portion 81 that is opposite to the connecting portion 82 and that has a weight member 83 mounted thereon. In this embodiment, the distal portion 81 widens in a direction away from the connecting portion 82, and the weight member 83 is formed as a metal block that is embedded in the distal portion 81. Preferably, the link plate is formed from a plastic material.

Due to the resistance to axial rotation of the axle 6 that is provided by the resistance unit 8, rotation of the generator housing 4 with the hubcap 3, such as when the hubcap 3 rotates with a vehicle wheel (not shown), results in rotation of the coil device 5 relative to the magnet 71 on the axle 6, thereby inducing electrical currents in the coil device 5 that are provided to the lamp unit 72 so as to enable the lamp unit 72 to generate a light output that is visible from the front side 311 of the hubcap 3.

Figure 6:
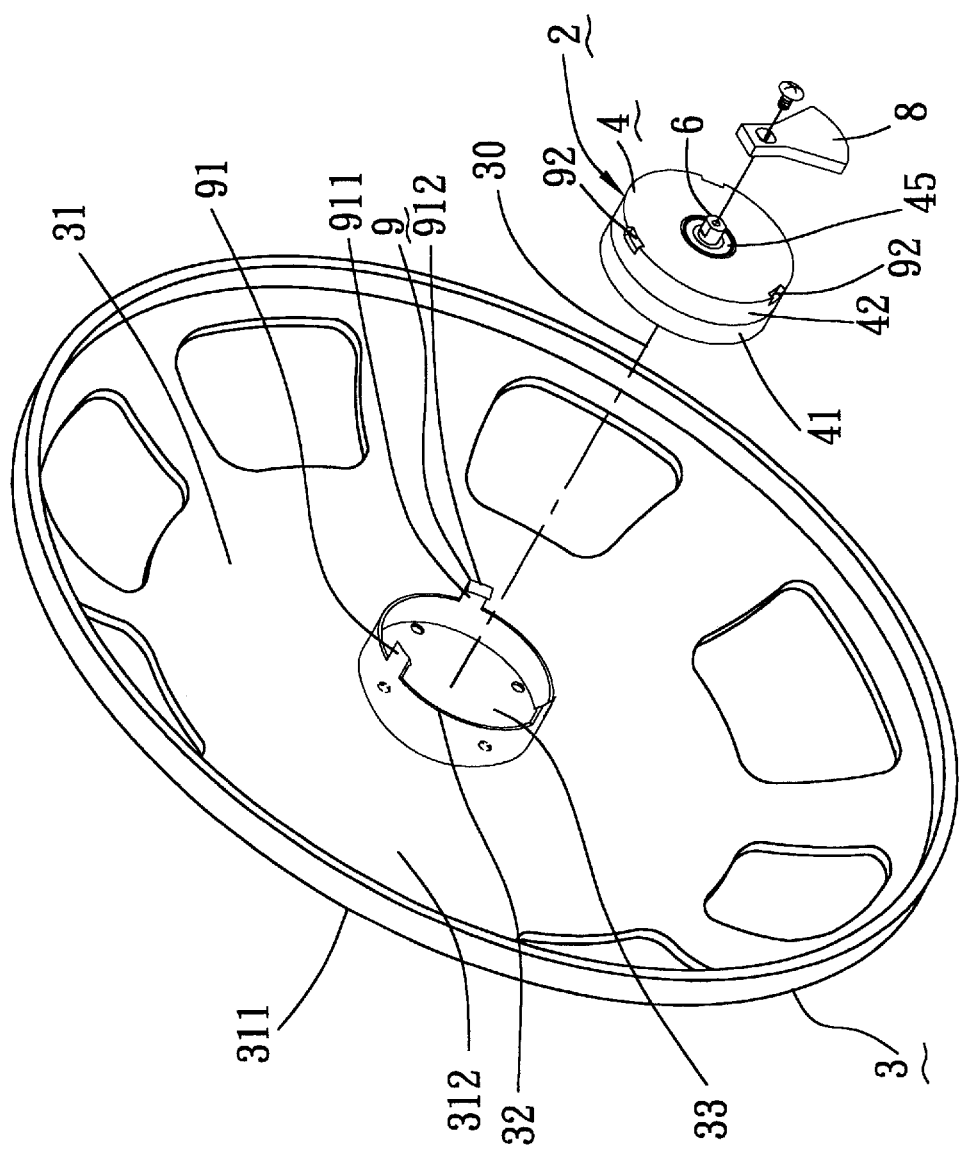
FIG. 6 is a partly exploded perspective view showing the second preferred embodiment of a light generator to be used with a hubcap according to the present invention.

Referring to FIG. 6, the second preferred embodiment of a light generator 2 according to the present invention is shown to be generally similar to the first preferred embodiment in construction, the main difference residing in the use of an engaging unit 9 to secure the generator housing 4 to the hubcap 3. The engaging unit 9 includes three angularly spaced apart hooks 91 formed on the annular wall 32 of the hubcap 3, and three grooves 92 formed in the generator housing 4 for engaging the hooks 91, respectively. Each hook 91 has an extension portion 911 connected to the annular wall 32, and a hook portion 912 remote from the annular wall 32 for engaging the corresponding groove 92.

Figure 7:
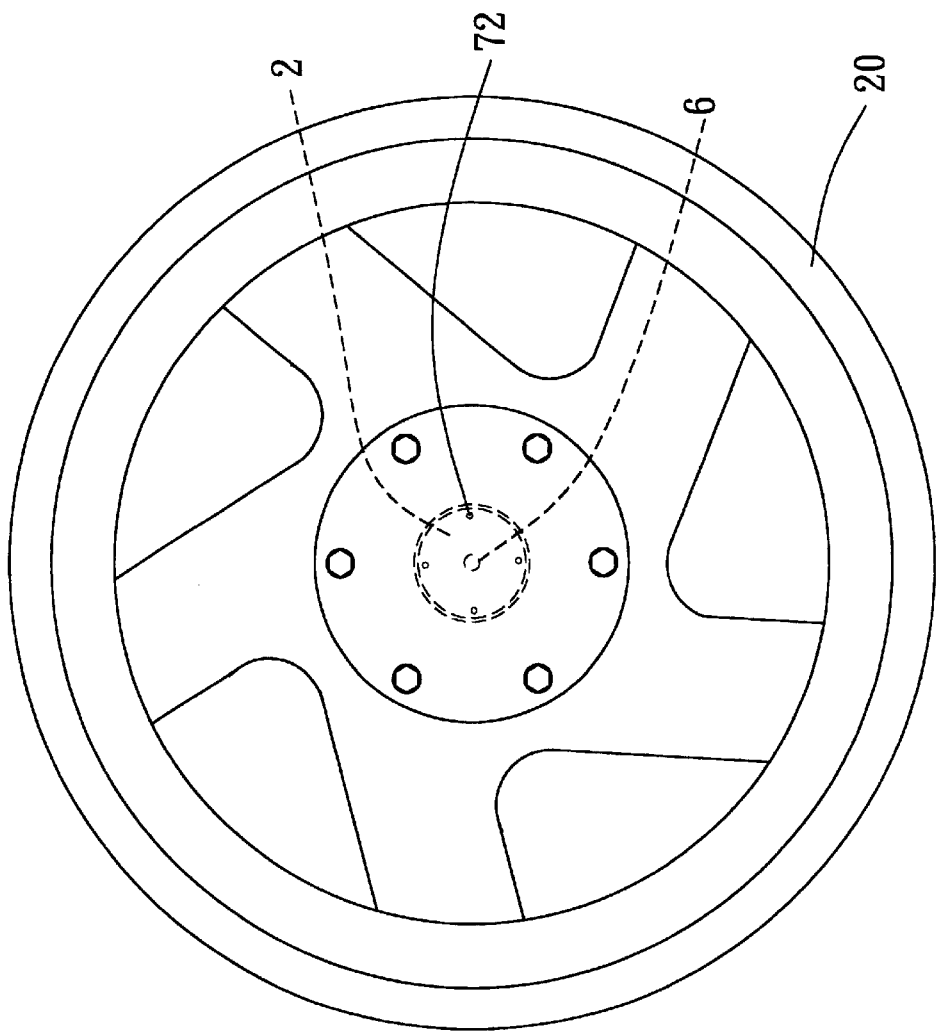
FIG. 7 is a schematic view showing the third preferred embodiment of a light generator according to the present invention that is applied to a vehicle wheel.

Referring to FIG. 7, the third preferred embodiment of a light generator 2 according to the present invention is adapted for mounting directly to a central portion of a vehicle wheel 20. The lamp unit 72 is exposed from a front side of the wheel 20 so that the light output of the lamp unit 72 is visible when the wheel 20 rotates.

In the light generator 2 of this invention, electric currents are induced as a result of the rotation of the rotatable object, such as a hubcap 3 or a vehicle wheel 20, to which the light generator 2 is applied. Since the impeller arrangement of the aforesaid prior art is not required, the drawbacks as stated hereinabove are accordingly eliminated. In addition, the simple design of the light generator 2 of this invention is highly flexible so as to be suitable for use in various applications, such as toy cars, rotary machines, etc.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A light generator for a rotatable object, said light generator comprising:

a generator housing adapted to be secured to the rotatable object for co-rotation therewith, said generator housing having a front housing part, a rear housing part, and an axle hole that extends from said front housing part through said rear housing part;

an axle mounted rotatably in said axle hole and having a coupling end that extends out of said axle hole at said rear housing part;

a magnet disposed in said generator housing and mounted co-rotatably on said axle;

a coil device mounted in said generator housing and including a spool that surrounds said magnet, a coil wound around said spool, and a pair of conductive caps capped on an assembly of said spool and said coil, each of said conductive caps being connected electrically to a respective end of said coil;

a lamp unit mounted on said generator housing and connected electrically to said conductive caps of said coil device; and a resistance unit mounted on said coupling end of said axle to resist axial rotation of said axle, said resistance unit including an elongate link plate having a connecting portion that is sleeved on said coupling end of said axle, and a distal portion that is opposite to said connecting portion and that includes a weighted portion;

wherein rotation of said generator housing with the rotatable object results in rotation of said coil device relative to said magnet, thereby inducing electrical currents in said coil device that are provided to said lamp unit so as to enable said lamp unit to generate a light output.

2. The light generator as claimed in claim 1, wherein said weighted portion includes a metal block embedded therein.

3. The light generator as claimed in claim 2 wherein said link plate is formed from a plastic material.

4. The light generator as claimed in claim 1, wherein said distal portion widens in a direction transverse to said axle away from said connecting portion.

5. The light generator as claimed in claim 1 wherein said resistance unit includes a fastener for securing said connecting portion of said link plate to said coupling end of said axle.

6. A light generator for a rotatable object, the light generator comprising:

a generator housing adapted to be secured to the rotatable object;

an axle rotatably mounted to the generator housing, the axle having a coupling end;

a magnet disposed in the generator housing and mounted to the axle;

a coil device mounted in the generator housing, the coil device including a coil, an electric current being induced in the coil when the coil device is rotated relative to the magnet;

a lamp unit mounted to the generator housing and electrically connected to the coil of the coil device so that the electric current induced in the coil causes the lamp unit to generate light; and a resistance unit mounted on the coupling end of the axle, the resistance unit including a suspended weighted portion;

wherein, when the generator housing is rotated with the rotatable object, the suspended weighted portion of the resistance unit resists rotation of the axle with the generator housing, thereby causing the coil device to rotate relative to the magnet to induce the electric current in the coil to cause the lamp unit to generate the light.

7. The light generator of claim 6, wherein the resistance unit includes an elongated link plate having connecting portion and a distal portion opposite to the connecting portion, the connecting portion being sleeved on the coupling end of the axle, the distal portion including the weighted portion.

8. The light generator of claim 7, wherein the weighted portion includes a metal block embedded in the distal portion of the link plate.

9. The light generator of claim 7, wherein the distal portion widens in a direction away from the connecting portion.

10. A light generator for a rotatable object, the light generator comprising:

a generator housing adapted to be secured to the rotatable object;

an axle rotatably mounted to the generator housing, the axle having a coupling end;

a magnet disposed within the generator housing;

a coil device disposed in the generator housing, the coil device including a coil, one of the magnet and the coil device being mounted to the axle, an electric current being induced in the coil when the axle is rotated relative to the generator housing;

a lamp unit mounted to the generator housing and electrically connected to the coil of the coil device so that the electric current induced in the coil causes the lamp unit to generate light; and a resistance unit mounted on the coupling end of the axle, the resistance unit including a suspended weighted portion;

wherein, when the generator housing is rotated with the rotatable object, the suspended weighted portion of the resistance unit resists rotation of the axle with the generator housing, thereby causing the axle to rotate relative to the generator housing to induce the electric current in the coil to cause the lamp unit to generate the light.

11. The light generator of claim 10, wherein the resistance unit includes an elongated link plate having a connecting portion and a distal portion opposite to the connecting portion, the connecting portion being sleeved on the coupling end of the axle, the distal portion including the weighted portion.

12. The light generator of claim 11, wherein the weighted portion includes a metal block embedded in the distal portion of the link plate.

13. The light generator of claim 11, wherein the distal portion widens in a direction away from the connecting portion.

* * * * *